United States Patent
Gao et al.

(10) Patent No.: US 11,646,776 B2
(45) Date of Patent: May 9, 2023

(54) MASSIVE MIMO BEAM DOMAIN ROBUST PRECODING TRANSMISSION METHOD AND SYSTEM

(71) Applicant: SOUTHEAST UNIVERSITY, Jiangsu (CN)

(72) Inventors: Xiqi Gao, Jiangsu (CN); Anan Lu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/629,181

(22) PCT Filed: Apr. 22, 2020

(86) PCT No.: PCT/CN2020/086168
§ 371 (c)(1),
(2) Date: Jan. 21, 2022

(87) PCT Pub. No.: WO2021/109419
PCT Pub. Date: Jun. 10, 2021

(65) Prior Publication Data
US 2022/0263554 A1 Aug. 18, 2022

(30) Foreign Application Priority Data

Dec. 5, 2019 (CN) .......................... 201911232382.X

(51) Int. Cl.
*H04B 7/06* (2006.01)
*H04B 7/0417* (2017.01)

(52) U.S. Cl.
CPC ......... *H04B 7/0617* (2013.01); *H04B 7/0417* (2013.01); *H04B 7/0634* (2013.01); *H04B 7/0639* (2013.01)

(58) Field of Classification Search
CPC .. H04B 7/0617; H04B 7/0417; H04B 7/0634; H04B 7/0639; H04B 7/0456; H04B 7/0413; Y02D 30/70
See application file for complete search history.

(56) References Cited

U.S. PATENT DOCUMENTS

2009/0238303 A1* 9/2009 Mondal ................. H04L 5/005
375/295
2016/0134352 A1 5/2016 Stirling-Gallacher
(Continued)

FOREIGN PATENT DOCUMENTS

CN 106899334 A 6/2017
CN 107483088 A 12/2017
(Continued)

OTHER PUBLICATIONS

Liu et al., "Robust Beamforming for Downlink 3D-MIMO Systems With l1-norm Bounded CSI Uncertainty," 2018 10th International Conference on Wireless Communications and Signal Processing, (WCSP), Oct. 20, 2018, ISSN: 2325-3746, 5 pages.

(Continued)

*Primary Examiner* — Fred A Casca
(74) *Attorney, Agent, or Firm* — Muncy, Geissler, Olds & Lowe, P.C.

(57) ABSTRACT

The present invention discloses a massive multiple-input multiple-output (MIMO) beam domain robust precoding transmission method and system. The method is based on base station (BS)-side and user-side refined sampling steering vector matrices, and considers the influence of channel aging caused by mobility, where obtained channel state information is refined beam domain a posteriori statistical channel information including channel mean and variance information. In the present invention, the BS performs robust precoding transmission by using the refined beam domain a posteriori statistical channel information, where a channel model on which the adopted refined beam domain a posteriori statistical channel information depends is a channel model which corresponds to a refined sampling space angle and adopts a steering vector matrix; the used statistical channel information is more sufficient and accurate, so that the problem of universality of massive MIMO to various typical mobile scenarios under the condition that the antenna size is limited can be solved; and high spectral (Continued)

efficiency is achieved, and the provided robust precoding design utilizes the sparsity of a beam domain channel and the structural characteristics of a sampling steering vector matrix, so that the calculation complexity can be greatly reduced.

11 Claims, 5 Drawing Sheets

(56) References Cited

U.S. PATENT DOCUMENTS

2017/0141829 A1* 5/2017 Qiao ................... H04B 7/0617
2019/0068294 A1* 2/2019 Zheng ............... H04L 25/03057
2020/0374175 A1* 11/2020 Ren ................... H04L 27/26524

FOREIGN PATENT DOCUMENTS

| CN | 108683619 A | 10/2018 |
|----|----|----|
| CN | 109490894 A | 3/2019 |
| CN | 109937540 A | 6/2019 |
| CN | 109981153 A | 7/2019 |
| WO | WO-2018142199 A1 | 8/2018 |

OTHER PUBLICATIONS

Lu et al., "Robust Transmission for Massive MIMO Downlink With Imperfect CSI," Aug. 31, 2019, IEEE Transactions on Communications, vol. 67, No. 8, ISSN: 0090-6778, 14 pages.

* cited by examiner

MASSIVE MIMO BEAM DOMAIN ROBUST PRECODING TRANSMISSION METHOD AND SYSTEM

TECHNICAL FIELD

The present invention belongs to the field of communication technologies, and relates to a massive multiple-input multiple-output (MIMO) beam domain robust precoding transmission method and system.

BACKGROUND

In order to improve the user experience and address the challenges posed by the rapid growth of wireless data service requirements and the requirements of new services, the future next-generation mobile networks need to support higher quality, higher transmission rate, higher mobility, higher user density, lower latency, lower energy consumption, and other scenarios. In recent years, to greatly improve the spectral efficiency and the power efficiency of radio spectrum, the massive MIMO technology is widely researched. Currently, the massive MIMO has been recognized as one of the key technologies of 5G. By equipping a base station (BS) with a massive antenna array, the massive MIMO greatly increases the system capacity, to make full use of spatial dimension resources. In the future, the massive MIMO will still be a hot research topic of mobile communication beyond 5G (B5G).

Establishment of a statistical channel model is the basis of a massive MIMO precoding transmission theoretical method. In an actual massive MIMO wireless system, a limited antenna size limits the application of a massive linear array antenna, and a more easily implementable antenna array such as a massive planar array antenna is usually configured on a BS side. As a result, the number of antennas in a single dimension is limited. Under this limitation, a conventional beam domain channel model based on a discrete fourier transform (DFT) matrix considerably deviates from an actual physical channel model. In another aspect, in the massive MIMO wireless system, the massive antenna array is configured for the BS, and the number of user antennas occupying the same time-frequency resource is increased, to limit time-frequency resources used for pilot. In a case that pilot resources are limited, an instantaneous channel estimation error cannot be avoided. Moreover, aging of instantaneous channel information obtained on the BS side and other factors further exist in a medium or high speed mobile communication scenario, and therefore it is significant to develop statistical channel models capable of describing various typical mobile communication scenarios. The related work in the literature mostly considers a massive linear array antenna, mostly adopts the conventional DFT based beam domain channel model, and has not considered an a posteriori statistical model based on an a priori statistical model and instantaneous channel information.

In the massive MIMO wireless transmission system, a downlink multi-user precoding transmission theoretical method is the key to coping with multi-user interference and achieving a spectral efficiency gain, and therefore is one of the most important issues of the massive MIMO wireless transmission system. In a conventional multi-user MIMO system, precoding methods are mainly divided into linear precoding methods and non-linear precoding methods. Although the non-linear precoding method may achieve optimal performance, extremely high complexity of the method limits use of the method in the massive MIMO system. However, a simple typical linear regularized zero forcing (RZF) precoding method has a relatively high requirement for instantaneous channel accuracy, and consequently is inapplicable to scenarios in which channel information is non-ideal, such as a pilot resource limited scenario and a medium or high speed mobile communication scenario. To achieve near-optimal performance, an optimal linear precoding transmission method needs to be investigated starting from obtainable channel information.

SUMMARY

Inventive objective: For deficiencies in the existing technology, the present invention discloses a massive MIMO beam domain robust precoding transmission method and system, to resolve a problem of adaptation of a massive MIMO technology to various typical scenarios.

Technical solution: To achieve the foregoing objective, the present invention provides the following technical solutions:

A massive MIMO beam domain robust precoding transmission method is provided, including:

obtaining a priori statistical channel information of user equipments (UEs) in a refined beam domain, where the refined beam domain is a refined beam domain with a multiple of 1 or a refined beam domain with an integer multiple or a fraction multiple greater than 1, and a refined beam domain channel and an antenna domain channel are converted into each other through a refined sampling steering vector matrix;

obtaining a posteriori statistical channel information of the UEs in the refined beam domain based on a pilot signal and the a priori statistical channel information in the refined beam domain, where the a posteriori statistical channel information includes channel mean and variance information in the refined beam domain; and performing robust precoding transmission by using the a posteriori statistical channel information including the channel mean and variance information in the refined beam domain.

Further, the antenna domain channel is obtained after the refined beam domain channel is left-multiplied by a user-side refined sampling steering vector matrix and right-multiplied by a conjugate matrix of a BS-side refined sampling steering vector matrix.

Further, the a priori statistical channel information in the refined beam domain is obtained by a BS through uplink channel sounding; or obtained by a UE through downlink channel sounding.

Further, the a posteriori statistical channel information in the refined beam domain is obtained by a BS through channel estimation and prediction by using an uplink pilot signal and the a priori statistical channel information in the refined beam domain; or obtained by a UE through channel estimation, prediction, and feedback by using a downlink pilot signal and the a priori statistical channel information in the refined beam domain.

Further, channel mean and variance information of an a posteriori statistical channel model in the refined beam domain is a posteriori mean and a posteriori variance information of the channel in the refined beam domain; and the a posteriori mean and a posteriori variance information of the channel includes:

conditional mean and conditional variance information in the refined beam domain under a condition that a BS receives an uplink pilot signal; or conditional mean and conditional variance information in the refined beam domain under a condition that a UE receives a downlink pilot signal.

Further, the obtaining a priori statistical channel information in a refined beam domain includes: transforming a pilot signal or channel information into the refined beam domain through a refined sampling steering vector matrix, and obtaining the a priori statistical channel information of the UEs in the refined beam domain by using sample statistics in the refined beam domain.

Further, the obtaining the a priori statistical channel information of the UEs in the refined beam domain by using sample statistics in the refined beam domain is specifically: solving a channel energy matrix according to the sample statistics in the refined beam domain and an equation of a function matrix of the channel energy matrix, where in the equation, only the channel energy matrix or channel amplitude matrix is an unknown matrix, and other matrices are known matrices.

Further, in the robust precoding transmission, a BS performs linear precoding matrix design of the UEs according to a weighted ergodic sum rate maximization criterion, and a weighted ergodic sum rate is a conditional mean of a weighted sum rate calculated according to the a posteriori statistical channel information in the refined beam domain.

Further, the weighted ergodic sum rate maximization criterion is replaced with an upper bound of the weighted ergodic sum rate maximization criterion; or a sum rate in the weighted ergodic sum rate maximization criterion is replaced with a deterministic equivalent thereof.

A massive MIMO beam domain robust precoding design method is provided, including: transforming initial precoding into a refined beam domain through a refined sampling steering vector matrix, where the refined beam domain is a refined beam domain with a multiple 1 or a refined beam domain with an integer multiple or a fraction multiple greater than 1;

performing beam domain precoding update in the refined beam domain by using a posteriori statistical channel information, where the a posteriori statistical channel information in the refined beam domain is obtained based on a pilot signal and a priori statistical channel information in the refined beam domain; and transforming a precoding result in the refined beam domain into an antenna domain through the refined sampling steering vector matrix.

Further, the method designs precoding by using a truncated conjugate gradient method, and includes:

(1) transforming the initial precoding into the refined beam domain through the refined sampling steering vector matrix;

(2) performing the sparse calculation of initial conjugate gradient in the refined beam domain by using the a posteriori statistical channel information;

(3) performing the sparse calculation of conjugate gradient update direction in the refined beam domain; and (4) performing conjugate gradient calculation in the refined beam domain and updating the precoding in the refined beam domain; and steps (3) and (4) are repeated until a preset number of iteration times is reached or the precoding converges, and the precoding in the refined beam domain is converted into precoding in the antenna domain by using a refined sampling steering vector matrix.

Further, the sampling steering vector matrix is an oversampled discrete fourier transform (DFT) matrix when steering vectors are uniformly sampled and the number of samples is an integer multiple of the number of antennas.

A computing device is provided, including a memory, a processor, and a computer program stored in the memory and executable on the processor, where the computer program, when being loaded to the processor, implements the massive MIMO beam domain robust precoding transmission method, or the massive MIMO beam domain robust precoding design method based on a truncated conjugate gradient method.

A massive MIMO beam domain robust precoding transmission system is provided, including a BS and a plurality of UEs, where the BS is configured to:

obtain a priori statistical channel information of the UEs in a refined beam domain, where the refined beam domain is a refined beam domain with a multiple of 1 or a refined beam domain with an integer multiple or a fraction multiple greater than 1, and a refined beam domain channel and an antenna domain channel are converted into each other through a refined sampling steering vector matrix;

obtain a posteriori statistical channel information of the UEs in the refined beam domain based on a pilot signal and the a priori statistical channel information in the refined beam domain, where the a posteriori statistical channel information includes channel mean and variance information in the refined beam domain; and perform robust precoding transmission by using the a posteriori statistical channel information including the channel mean and variance information in the refined beam domain.

A massive MIMO beam domain robust precoding transmission system is provided, including a BS and a plurality of UEs, where the BS is equipped with the computing device.

Beneficial effects: Compared with the existing technology, the massive MIMO beam domain downlink robust transmission method provided in present invention can resolve the problem of universal adaptation of the massive MIMO to various typical mobile scenarios, and achieve high spectral efficiency. Robust precoding transmission is performed by using the a posteriori statistical channel information including the a posteriori channel mean and variance information in the refined beam domain, and the used statistical channel information is sparse, so that the robust precoding transmission can be implemented with low complexity. Through a robust precoding method, dimension reduction transmission may be implemented, and pilot overheads required during data transmission may be reduced, thereby reducing the complexity of demodulation or detection, and improving the overall efficiency of transmission.

DETAILED DESCRIPTION

The following describes the technical solutions provided in the present invention in detail with reference to specific embodiments. It should be understood that the following specific implementations are merely intended to describe the present invention rather than to limit the scope of the present invention.

Figure 1:
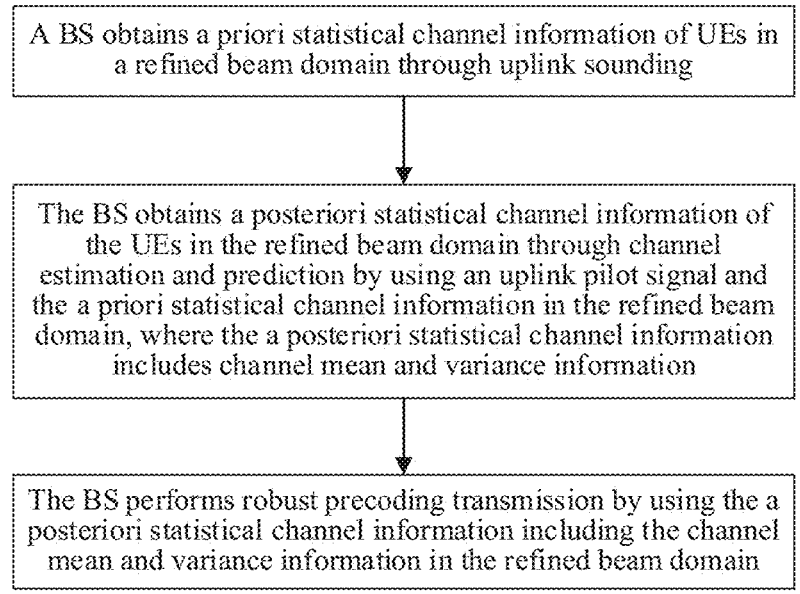
FIG. 1 is a flowchart of a massive MIMO beam domain robust precoding transmission method based on uplink sounding.

As shown in FIG. 1, an embodiment of the present invention discloses a massive MIMO beam domain robust transmission method based on uplink sounding, and the method includes the following steps: A BS obtains a priori statistical channel information of UEs in a refined beam domain through uplink channel sounding: the BS obtains a posteriori statistical channel information of the UEs in the refined beam domain based on an uplink pilot signal and the a priori statistical channel information in the refined beam domain, where the a posteriori statistical channel information includes a posteriori channel mean (or referred to as expected value) and variance information; and the BS performs robust precoding transmission by using the a posteriori statistical channel information including the a posteriori channel mean and variance information in the refined beam domain.

Figure 2:
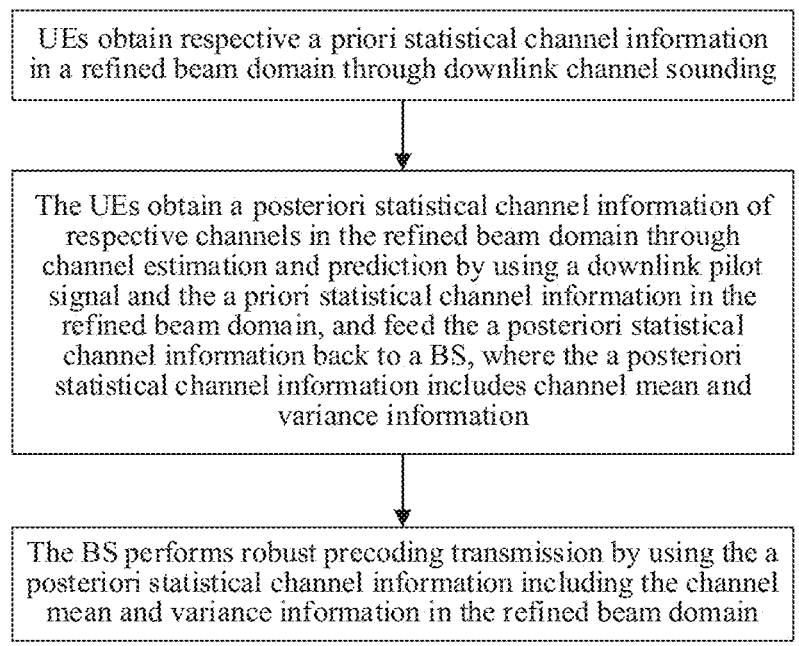
FIG. 2 is a flowchart of a massive MIMO beam domain robust precoding transmission method based on user feedback.

As shown in FIG. 2, an embodiment of the present invention discloses a massive MIMO beam domain robust transmission method based on user feedback, and the method includes the following steps: UEs obtain respective a priori statistical channel information in a refined beam domain through downlink channel sounding; the UEs obtain a posteriori statistical channel information of respective channels in the refined beam domain through channel estimation and prediction by using a downlink pilot signal and the a priori statistical channel information in the refined beam domain, and feed the a posteriori statistical channel information back to a BS, where the a posteriori statistical channel information in the refined beam domain includes channel mean and variance information; and the BS performs robust precoding transmission by using the a posteriori statistical channel information including the channel mean and variance information in the refined beam domain.

The UE in the foregoing embodiment may be a mobile terminal such as a mobile phone, an in-vehicle device, or an intelligent equipment, or a fixed terminal; and the antenna domain channel may be obtained after the refined beam domain channel is left-multiplied by a user-side refined sampling steering vector matrix and right-multiplied by a conjugate matrix of a BS-side refined sampling steering vector matrix, where the refined beam domain is a refined beam domain with a multiple of 1 or a refined beam domain with an integer multiple or a fraction multiple greater than 1, and the multiple is a ratio of the number of beams to the number of antennas. The a priori statistical channel information of the UEs in the refined beam domain may be obtained by using sample statistics in the refined beam domain. Channel mean and variance information of an a posteriori statistical channel model in the refined beam domain is a posteriori mean and a posteriori variance information of the channel in the refined beam domain, and includes conditional mean and conditional variance information in the refined beam domain under a condition that a BS receives an uplink pilot signal; or conditional mean and conditional variance information in the refined beam domain under a condition that a UE receives a downlink pilot signal.

Figure 3:
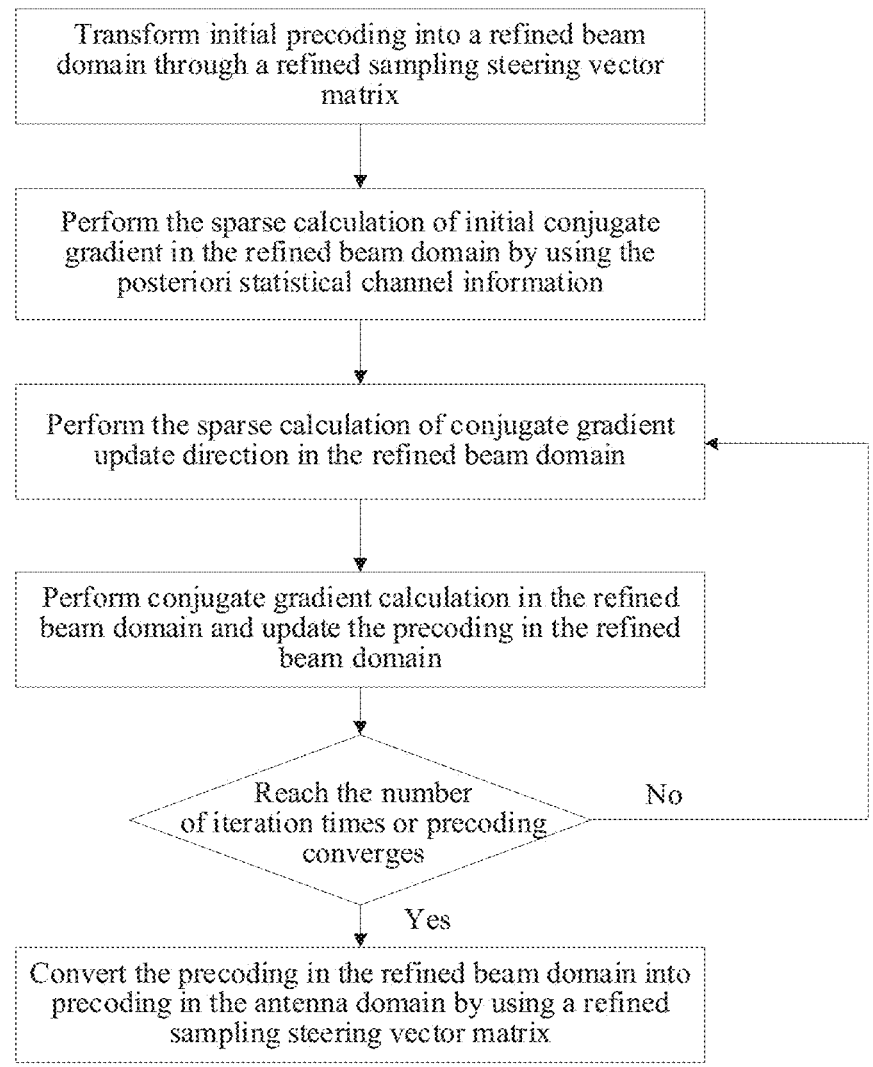
FIG. 3 is a flowchart of a truncated conjugate gradient method of massive MIMO beam domain robust precoder design.

As shown in FIG. 3, an embodiment of the present invention discloses a massive MIMO beam domain robust precoding design method, where the method designs precoding by using a truncated conjugate gradient method, and includes: (1) transforming the initial precoding (which may be inputted externally or generated randomly) into the refined beam domain through the refined sampling steering vector matrix; (2) performing the sparse calculation of initial conjugate gradient in the refined beam domain by using the a posteriori statistical channel information; (3) performing the sparse calculation of conjugate gradient update direction in the refined beam domain; and (4) performing conjugate gradient calculation in the refined beam domain and updating the precoding in the refined beam domain; and steps (3) and (4) are repeated until a preset number of iteration times is reached or the precoding converges, and the precoding in the refined beam domain is converted into precoding in the antenna domain by using a refined sampling steering vector matrix.

The method of the present invention is mainly applicable to a massive MIMO system equipped with a massive antenna array on a BS side to serve a plurality of users at the same time. A specific implementation process of the refined beam domain downlink robust precoding transmission method involved in the present invention is described below in detail with reference to a specific communication system example. It should be noted that, the method of the present invention is not only applicable to a specific system model exemplified below, but also applicable to system models with other configurations.

I. System Configuration

A flat block fading massive MIMO system is considered, and it is assumed that channels of mobile terminals in the system remain unchanged in T symbol intervals. The massive MIMO system is formed by one BS and K mobile terminals. Massive uniform planar array antennas are configured for the BS, the numbers of antennas of each row and each column are respectively $M_{h'}$ and $M_{v'}$, and the total number of transmit antennas is $M_t = M_h M_v$. For simplicity, it is assumed that the number of antennas configured for each user is $M_k$. A system time resource is divided into a plurality of slots, each slot includes $N_b$ time blocks, and each time block includes T symbol intervals. In this embodiment, the considered massive MIMO system works in a time division duplexing (TDD) mode. For simplicity, it is assumed that only an uplink channel training stage and a downlink transmission stage exist, where the downlink transmission stage includes transmission of pilot signals and data signals in the precoding domain. In each slot, an uplink pilot signal is transmitted on only the first time block. The second to $N_b$-th time blocks are used for transmitting downlink pilot and data signals in the precoding domain. The length of an uplink training sequence is the length of a block, that is, T symbol intervals. For a frequency division duplexing (FDD) mode, the uplink channel training stage may be replaced with a downlink channel feedback stage, and the downlink transmission stage remains unchanged. Specifically, the first block transmits a downlink omnidirectional pilot signal, and receives feedback of the mobile terminal.

II. Refined Beam Domain a Priori Statistical Channel Model

A refined beam domain a priori statistical channel model based on a refined sampling steering vector matrix is described in detail below. Refinement factors in horizontal and vertical dimensions of the BS side are respectively defined as $N_h$ and $N_v$, and $M_h = N_h M_{h'}$ and $M_v = N_v M_{v'}$, respectively represent the numbers of refined sampling steering vectors in the horizontal and vertical dimensions. In the conventional beam domain channel model, the number of steering vectors and the number of antennas are the same.

For the refined model, more refined steering vectors are adopted, and $N_h$ and $N_v$ are integers or fractions greater than or equal to 1. Further, the following is defined:

$$v_x(v_n) = M_{h'}^{-1/2}\begin{bmatrix} 1 & e^{-j2\pi v_n} & \ldots & e^{-j2\pi(M_{h'}-1)v_n} \end{bmatrix} \quad (1)$$

and $$v_z(u_m) = M_{v'}^{-1/2}\begin{bmatrix} 1 & e^{-j2\pi u_m} & \ldots & e^{-j2\pi(M_{v'}-1)u_m} \end{bmatrix} \quad (2)$$

Then, matrices of steering vectors in the horizontal and vertical dimensions are respectively represented as:

$$V_{M_h} = [\, v_x(v_1)^T \quad v_x(v_2)^T \quad \ldots \quad v_x(v_{M_h})^T \,] \in \mathbb{C}^{M_{h'} \times M_h} \quad (3)$$

and $$V_{M_v} = [\, v_z(u_1)^T \quad v_z(u_2)^T \quad \ldots \quad v_z(u_{M_v})^T \,] \in \mathbb{C}^{M_{v'} \times M_v} \quad (4)$$

where steering vectors in the matrices of steering vectors $V_{M_h}$ and $V_{M_v}$ are not required to be orthogonal to each other. When the vectors in the steering vector matrices are uniformly sampled, that is, $v_n=(n-1)/M_h$ and $u=(m-1)/M_v$, and $N_h$ and $N_v$ are positive integers greater than 1, $V_{M_h}$ and $V_{M_v}$ are oversampled DFT matrices. The matrix $V_{M_t}^H = V_{M_h}^H \otimes V_{M_v}^H$ represents the BS-side refined sampling steering vector matrix, and then steering vectors in $V_{M_t}^H$ are not required to be orthogonal to each other either. Similarly, a user-side refinement factor is defined as $N_k$, which is an integer or a fraction greater than or equal to 1. The number $M_k = N_k M_{k'}$ represents the number of user-side refined sampling steering vectors. Further, the following is defined:

$$a_r(u_i) = M_{k'}^{-1/2}\begin{bmatrix} 1 & e^{-j2\pi u_i} & \ldots & e^{-j2\pi(M_{k'}-1)u_i} \end{bmatrix} \quad (5)$$

Then, a user-side refined sampling steering vector matrix is defined as:

$$U_k = [\, a_r(u_1)^T \quad a_r(u_2)^T \quad \ldots \quad a_r(u_{M_k})^T \,] \in \mathbb{C}^{M_{k'} \times M_k} \quad (6)$$

Similarly, steering vectors in $U_k$ are not required to be orthogonal to each other either. When the vectors in the steering vector matrix are uniformly sampled, that is, $u_i=(i-1)/M_k$, and $N_k$ is a positive integer greater than 1, $U_k$ is an oversampled DFT matrix. The matrix $H_{k,m,n}$ represents a channel of the $k^{th}$ user on the $n^{th}$ block in the $m^{th}$ slot, and then the beam domain a priori statistical channel model of the considered massive MIMO system may be represented as:

$$H_{k,m,n} = U_k G_{k,m,n} V_{M_t}^H \quad (7)$$

where $G_{k,m,n}=(M_k \odot W_{k,m,n})$ is a refined beam domain channel matrix whose elements are independent, and has each row corresponding to a user-side refined beam domain and each column corresponding to a BS-side two-dimensional refined spatial beam domain, $M_k$ is a refined beam domain channel amplitude matrix, and $W_{k,m,n}$ is a random matrix formed by independently and identically distributed complex Gaussian random variables. When there are fewer user-side antennas, $U_k$ in the formula (7) may be replaced with an identity matrix. It should be noted that, the method of the present invention is not only applicable to massive uniform planar array antennas, but also applicable to antennas in other forms, such as cylindrical array antennas, and planar array antennas whose array elements are polarization antennas. When the antenna array used on the BS side or user side is changed, $V_{M_t}^H$ or $U_k$ only needs to be changed to a steering vector matrix of a corresponding array. Compared with the conventional beam domain a priori statistical channel model based on the DFT matrix, the refined beam domain statistical model has more statistical characteristic directions, and therefore can more accurately represent an actual physical channel model. A refined beam domain channel energy matrix $\Omega_k$ of the massive MIMO system is defined as $\Omega_k = M_k \odot M_k$.

III. Method for Obtaining a Priori Statistical Channel Information of a Refined Beam Domain Channel Model For the considered massive MIMO system working in the TDD mode, because uplink and downlink channels have reciprocity, the obtained uplink channel statistical information may be directly used as the downlink channel statistical information. No instantaneous reciprocity between channels exists for the FDD system, and downlink statistical channel information may be obtained by the user side and fed back to the BS. A method for obtaining a priori statistical channel information in a refined beam domain is provided below. It is assumed that $X_k$ is a pilot matrix of the $k^{th}$ user, the pilot matrix may be used for obtaining a priori statistical channel information, pilot matrices of users are orthogonal, and pilots of different antennas do not need to be orthogonal, that is, $X_k$ is unnecessarily a unitary matrix. The signal $Y_{m,1}$ represents a pilot signal received by the BS on the $1^{th}$ block in the $m^{th}$ slot, and then $$Y_{m,1} = \sum_k H_{k,m,1}^T X_k + Z_{m,1} = \sum_k V_{M_t}^* G_{k,m,1}^T U_k^T X_k + Z_{m,1} \quad (8)$$

Further, $Y_{m,1}^T = \sum_k X_k H_{k,m,1} + Z_{m,1}^T = \sum_k X_k^T U_k G_{k,m,1} V_{M_t}^H + Z_{m,1}^T \quad (9)$ where the superscript T represents transpose, the superscript * represents conjugate, the superscript H represents conjugate transpose, and $Z_{m,1}$ is a random matrix formed by independently and identically distributed complex Gaussian random variables. Because the pilot matrices of the users are orthogonal, $Y_{m,1}^T$ is left-multiplied by $U_k^H X_k^*$ and right-multiplied by $V_{M_t}$ to obtain $$U_k^H X_k^* Y_{m,1}^T V_{M_t} = U_k^H X_k^* X_k^T U_k (M_k \odot W_{k,m,1}) V_{M_t}^H V_{M_t} + U_k^H Z_{m,1}^T X_k^H V_{M_t} \quad (10)$$

where $\odot$ represents a Hadmard product. Let $N = \mathbb{E}\{Z_{m,1}^T \odot Z_{m,1}^H\}$, and further $$\mathbb{E}\{U_k^H X_k^* Y_{m,1}^T V_{M_t} \odot (U_k^H X_k^* Y_{m,1}^T V_{M_t})^*\} = \quad (11)$$

$$(U_k^H X_k^* X_k^T U_k \odot (U_k^H X_k^* X_k^T U_k)^*) \Omega_k (V_{M_t}^H V_{M_t} \odot (V_{M_t}^H V_{M_t})^*) +$$

$$(U_k^H X_k^* \odot (U_k^H X_k^*)^*) N (V_{M_t} \odot (V_{M_t})^*)$$

The matrix $T_{kr}$ represents $U_k^H X_k^* X_k^T U_k \odot (U_k^H X_k^* X_k^T U_k)^*$, the matrix $T_t$ represents $V_{M_t}^H V_{M_t} \odot (V_{M_t}^H V_{M_t})^*$, the matrix $O_{kr}$ represents $U_k^H X_k^* \odot (U_k^H X_k^*)^*$, and the matrix $O_t$ represents $V_{M_t} \odot (V_{M_t})^*$, to obtain $$\mathbb{E}\{U_k^H X_k^* Y_{m,1}^T V_{M_t} \odot (U_k^H X_k^* Y_{m,1}^T V_{M_t})^*\} = T_{kr}\Omega_k T_t + O_{kr}NO_t \quad (12)$$

If the noise variance matrix N is known, then $O_{kr}NO_t$ is a known matrix. For brevity, let $\Phi_k \in \mathbb{C}^{M_k \times NM_t}$, where $N=N_h N_v$ be $$\Phi_k = \mathbb{E}\{U_k^H X_k^* Y_{m,1}^T V_{M_t} \odot (U_k^H X_k^* Y_{m,1}^T V_{M_t})^*\} \quad (13)$$

Because only a sample average can be obtained in an actual system, $\Phi_k$ needs to be re-defined as a refined beam domain sample statistical matrix $$\Phi_k = \frac{1}{M}\sum_{m=1}^{M} U_k^H X_k^* Y_{m,1}^T V_{M_t} \odot (U_k^H X_k^* Y_{m,1}^T V_{M_t})^* \quad (14)$$

where M represents the number of samples. The formula (13) may be represented, based on elements, as:

$$[\Phi_k]_{ij} = \frac{1}{M}\sum_{m=1}^{M}\left|[U_k^H X_k^* Y_{m,1}^T V_{M_t}]_{ij}\right|^2 \quad (15)$$

By using $\Phi_k$, the formula (11) may be changed to:

$$\Phi_k = T_{kr}\Omega_k T_t + O_{kr}NO_t \quad (16)$$

In the previous formula. $T_{kr}$ and $T_t$ are known matrices, and $O_{kr}NO_t$ is similarly a known matrix. Therefore, the only unknown parameter matrix on the right of the equal sign of the foregoing equation is a refined beam domain channel energy matrix $\Omega_k$. Therefore, the channel energy matrix $\Omega_k$ is obtained based on the sample statistical matrix $\Phi_k$ and the deterministic matrices $T_{kr}$, $T_t$, and $O_{kr}NO_t$. Let $T_{kr}\Omega_k T_t + O_{kr}NO_t$ refer to a function matrix of the channel energy matrix. The formula (16) belongs to a parameter matrix estimation problem. To solve $\Omega_k$, an optimization problem may be established according to the formula (16), and then the optimization problem is solved by using a method such as a gradient descent method, a conjugate gradient method, a Newton iteration method, or a method for performing iteration according to an iteration formula obtained under a KKT condition. To describe the problem more clearly, a specific estimation method is provided below. To estimate the channel energy matrix $\Omega_k$ or the channel amplitude matrix $M_k$, by using a KL divergence between the refined beam domain sample statistical matrix $\Phi_k$ and the function matrix $T_{kr}\Omega_k T_t + O_{kr}NO_t$ of the channel energy matrix, a target function is defined as:

$$g(M_k) = -\sum_{ij}[\Phi_k]_{ij}\log[T_{kr}\Omega_k T_t + O_{kr}NO_t]_{ij} + \sum_{ij}[T_{kr}\Omega_k T_t]_{ij} + c_0 \quad (17)$$

In the previous formula, $c_0$ is a constant unrelated to $M_k$. To perform optimization to obtain $M_k$ with the minimum KL divergence, the target function is derived first, and the derivative of the second half in the formula (16) is:

$$\frac{\partial \sum_{ij}[T_{kr}\Omega_k T_t]_{ij}}{\partial M_k} = (T_t J T_{kr})^T \odot M_k \quad (18)$$

where J is an all-ones matrix. The derivation of the first half is slightly complex, and is:

$$\frac{\partial \sum_{ij}\log[T_{kr}\Omega_k T_t + O_{kr}NO_t]_{ij}}{\partial M_k} = (T_t J T_{kr})^T \odot M_k \quad (19)$$

where $Q \in \mathbb{C}^{M_k \times NM_t}$ and $$[Q]_{ij} = \frac{[\Phi_k]_{ij}}{[T_{kr}\Omega_k T_t + O_{kr}NO_t]_{ij}} \quad (20)$$

To sum up, $g(M_k)$ may be derived as follows:

$$\frac{\partial g(M_k)}{\partial M_k} = (T_t J T_{kr})^T \odot M_k - (T_t Q^T T_{kr})^T \odot M_k \quad (21)$$

Let $g(M_k)=0$, and a necessary condition of an optimal point may be as follows:

$$(T_t J T_{kr})^T \odot M_k - (T_t Q^T T_{kr})^T \odot M_k = 0 \quad (22)$$

Further, $$(T_t J T_{kr})^T \odot M_k = (T_t Q^T T_{kr})^T \odot M_k \quad (23)$$

Based on the necessary condition, an iteration formula may be constructed as follows:

$$M_k = \frac{1}{2}M_k + A_k \odot M_k \text{ where} \quad (24)$$

$$[A_k]_{ij} = \frac{\left[(T_t Q^T T_{kr})^T\right]_{ij}}{2\left[(T_t J T_{kr})^T\right]_{ij}} \quad (25)$$

According to the mentioned iteration formula, the refined sampling beam domain channel amplitude matrix may be obtained. To sum up, steps of obtaining the statistical channel information in the refined beam domain may be summarized as follows:

Step 1: Receive pilot signals $X_k$ transmitted by mobile terminals.

Step 2: Multiply the received pilot signals $Y_{m,1}$ and local user pilot signals $X_k$ respectively to obtain $X_k^* Y_{m,1}^T$.

Step 3: Transform the multiplied pilot signals into a refined beam domain $U_k^H X_k^* Y_{m,1}^T V_{M_t}$.

Step 4: Obtain a priori statistical channel information of the mobile terminals in the refined beam domain by using sample statistics $$\Phi_k = \frac{1}{M}\sum_{m=1}^{M} U_k^H X_k^* Y_{m,1}^T V_{M_t} \odot \left(U_k^H X_k^* Y_{m,1}^T V_{M_t}\right)^*$$

in the refined beam domain.

The method for obtaining a priori statistical channel information of the mobile terminals in the refined beam domain by using sample statistics $\Phi_k$ in the refined beam domain in step 4 may be further detailed as follows:

Step 1: Calculate $T_t=V_{M_t}^H V_{M_t}\odot(V_{M_t}^H V_{M_t})^*$, $T_{kr}=U_k^H X_k^* X_k^T U_k\odot(U_k^H X_k^* X_k^T U_k)^*$, $O_{kr}=U_k^H X_k^*\odot(U_k^H X_k^*)^*$, and $O_t=V_{M_t}\odot(V_{M_t})^*$.

Step 2: Initialize $M_k$.

Step 3: Iteratively calculate $M_k=\frac{1}{2}M_k+A_k\odot M_k$, where $A_k$ is updated with $M_k$ as follows:

$$[A_k]_{ij} = \frac{[(T_tQ^TT_{kr})^T]_{ij}}{2[(T_tJT_{kr})^T]_{ij}},\ [Q]_{ij} = \frac{[\Phi_k]_{ij}}{[T_{kr}\Omega_k T_t + O_{kr}NO_t]_{ij}},\ \text{and } \Omega_k = M_k\odot M_k$$

The method for obtaining a priori statistical channel information in a refined beam domain by using a pilot signal is described above. In an actual system, alternatively, instantaneous channel information may be first obtained, and then a priori statistical channel information in a refined beam domain is obtained by using the instantaneous channel information. A method for obtaining statistical channel information $\Omega_k$ in a refined beam domain in a case that channel information is known is provided below. The matrix $H_{k,m,l}$ is left-multiplied by $U_k^H$ and right-multiplied by $V_{M_t}$ to obtain $$U_k^H H_{k,m,1} V_{M_t} = U_K^H U_k(M_k\odot W_{k,m,1})V_{M_t}^H V_{M_t} \quad (26)$$

Further, $\mathbb{E}\{U_k^H H_{k,m,1} V_{M_t}\odot\left(U_k^H H_{k,m,1} V_{M_t}\right)^*\} =$ (27)

$$\left(U_k^H U_k\odot\left(U_k^H U_k\right)^*\right)\Omega_k\left(V_{M_t}^H V_{M_t}\odot\left(V_{M_t}^H V_{M_t}\right)^*\right)$$

In this case, the refined beam domain sample statistical matrix $\Phi_k\in\mathbb{C}^{M_k\times NM_t}$ is changed to:

$$\Phi_k = \frac{1}{M}\sum_{m=1}^{M} U_k^H H_{k,m,1} V_{M_t}\odot\left(U_k^H H_{k,m,1} V_{M_t}\right)^* \quad (28)$$

or is represented, based on elements, as:

$$[\Phi_k]_{ij} = \frac{1}{M}\sum_{m=1}^{M}\left|\left[U_k^H H_{k,m,1} V_{m_t}\right]_{ij}\right|^2 \quad (29)$$

Further, the following may be obtained:

$$\Phi_k = T_{kr}\Omega_k T_t \quad (30)$$

In this case, $T_{kr}$ is changed to $T_{kr}=U_k^H U_k\odot(U_k^H U_k)^*$, and a function for a KL divergence between $\Phi_k$ and the function matrix $T_{kr}\Omega_k T_t$ of the channel energy matrix is simplified into:

$$g(M_k) = -\sum_{ij}[\Phi_k]_{ij}\log[T_{kr}\Omega_k T_t]_{ij} + \sum_{ij}[T_{kr}\Omega_k T_t]_{ij} + c_0 \quad (31)$$

In the previous formula, $c_0$ is a constant unrelated to $M_k$. Similarly, to perform optimization to obtain $M_k$ with the minimum KL divergence, the target function is derived first, and the derivative of the second half in the formula (31) is changed to:

$$\frac{\partial\sum_{ij}[T_{kr}\Omega_k T_t]_{ij}}{\partial M_k} = (T_tJT_{kr})^T\odot M_k \quad (32)$$

where J is an all-ones matrix. The derivation of the first half is changed to:

$$\frac{\partial\sum_{ij}[\Phi_k]_{ij}\log[T_{kr}\Omega_k T_t]_{ij}}{\partial M_k} = \left(T_tQ^TT_{kr}\right)^T\odot M_k \quad (33)$$

where $Q\in\mathbb{C}^{M_k\times NM_t}$ and $$[Q]_{ij} = \frac{[\Phi_k]_{ij}}{[T_{kr}\Omega_k T_{kr}]_{ij}}. \quad (34)$$

To sum up, $g(M_k)$ may be derived as follows:

$$\frac{\partial g(M_k)}{\partial M_k} = (T_tJT_{kr})^T M_k - \left(T_tQ^TT_{kr}\right)^T\odot M_k \quad (35)$$

Let $g(M_k)=0$, and a necessary condition of an optimal point may be as follows:

$$(T_tJT_{kr})^T M_k - \left(T_tQ^TT_{kr}\right)^T\odot M_k = 0 \quad (36)$$

Further, $$(T_tJT_{kr})^T M_k = \left(T_tQ^TT_{kr}\right)^T\odot M_k \quad (37)$$

Based on the necessary condition, an iteration formula is constructed as follows:

$$M_k = \frac{1}{2}M_k + A_k\odot M_k \quad (38)$$

$$\text{where } [A_k]_{ij} = \frac{\left[\left(T_tQ^TT_{kr}\right)^T\right]_{ij}}{2\left[(T_tJT_{kr})^T\right]_{ij}}.$$

To sum up, steps of obtaining the statistical channel information in the refined beam domain in a case that channel information is known may be summarized as follows:

Step 1: Obtain a channel matrix $H_{k,m,l}$.

Step 2: Transform the channel matrix into a refined beam domain $U_k^H H_{k,m,l} V_{M_t}$.

Step 3: Obtain a priori statistical channel information of the mobile terminals in the refined beam domain by using sample statistics $$\Phi_k = \frac{1}{M} \sum_{m=1}^{M} U_k^H H_{k,m,1} V_{M_t} \odot (U_k^H H_{k,m,1} V_{M_t})^*$$

in the refined beam domain.

The method for obtaining a priori statistical channel information of the mobile terminals in the refined beam domain by using sample statistics $\Phi_k$ in the refined beam domain in step 4 may be further detailed as follows:

Step 1: Calculate $[T_t]_{ij} = |[V_{M_t}^H V_{M_t}]_{ij}|^2$ according to $V_{M_t}$.

Step 2: Initialize $M_k$.

Step 3: Iteratively calculate $M_k = \frac{1}{2} M_k + A_k \odot M_k$, where $A_k$ is updated with $M_k$ as follows:

$$[A_k]_{ij} = \frac{[(T_t Q^T T_{kr})^T]_{ij}}{2[(T_t J T_{kr})^T]_{ij}}, \ [Q]_{ij} = \frac{[\Phi_k]_{ij}}{[T_{kr} \Omega_k T_{kt}]_{ij}}, \text{ and } \Omega_k = M_k \odot M_k$$

III. Refined Beam Domain a Posteriori Statistical Channel Model

It is assumed that channel information obtained on the $1^{th}$ time block in the slot m−1 is used for transmission in the $m^{th}$ slot. To describe massive MIMO time correlation characteristics, a first-order Gaussian Markov model is taken to describe a time correlation model. In the model, a refined beam domain channel on the $n^{th}$ time block in the $m^{th}$ slot may be represented as:

$$G_{k,m,n} = \alpha_{k,m}(N_b + n - 1) G_{k,m-1,1} + \sqrt{1 - \alpha_{k,m}^2(N_b + n - 1)}(M_k \odot W_{k,m,n}) \quad (39)$$

where $\alpha_{k,m}(N_b+n-1)$ is a correlation factor of channels $G_{k,m,n}$ and $G_{k,m-1,1}$, namely, a time correlation factor of the function related to movement speeds of users. There are a plurality of methods for obtaining the correlation factor $\alpha_{k,m}$, and it is assumed herein that the correlation factor is known. Actually, a method for calculating an empirical correlation factor of channel samples may be adopted, or a method for calculating a correlation factor $\alpha_{k,m}$ based on a Jakes autocorrelation model frequently used in the literature may be adopted, that is, $\alpha_{k,m}(n) = J_0(2\pi v_k f_c n T \tau / c)$, where $J_0(\cdot)$ represents a zero-order Bessel function of first kind, $\tau$ represents time corresponding to a time interval, $v_k$ represents a speed of the $k^{th}$ user, $f_c$ represents a carrier frequency, and c represents the speed of light. The model in the formula (8) is used for performing channel prediction. In this embodiment, to take implementation complexity of the system into consideration, precoding is performed on the entire slot m. For simplicity, the channel estimation error is not considered, and if accurate channel information of the refined beam domain channel matrix $G_{k,m-1,1}$ may be obtained, the a posteriori statistical information of the refined beam channel on the slot m may be obtained as follows:

$$G_{k,m} = \beta_{k,m} G_{k,m-1,1} + \sqrt{1 - \beta_{k,m}^2}(M_k \odot W_{k,m}) \quad (40)$$

where $\beta_{k,m}$ are related to the correlation factors $\alpha_{k,m}$ between channels on the entire slot m with $H_{k,m-1,1}$, and a feasible way is to take a root mean square of all correlation factors $\alpha_{k,m}$ on the slot. Further, the refined beam domain a posteriori statistical model on the slot m may be obtained as follows:

$$H_{k,m} = \beta_{k,m} H_{k,m-1,1} + \sqrt{1 - \beta_{k,m}^2} U_k (M_k \odot W_{k,m}) V_{M_t}^H \quad (41)$$

When the channel estimation error is considered, the channel a posteriori statistical model in the formula (10) needs to be obtained by further performing research according to a channel estimation error model, a time correlation model, and an a priori statistical model. To facilitate calculation in the refined beam domain, $H_{k,m-1,1}$ is represented as $H_{k,m-1,1} = U_k G_{k,m-1,1} V_{M_t}^H$, and then the refined a posteriori statistical model may be further represented as:

$$H_{k,m} = \beta_{k,m} U_k G_{k,m-1,1} V_{M_t}^H + \sqrt{1 - \beta_{k,m}^2} U_k (M_k \odot W_{k,m}) V_{M_t}^H \quad (42)$$

Let $\hat{H}_{k,m}^b = \beta_{k,m} G_{k,m-1,1}$, $M_{k,m}' = \sqrt{1 - \beta_{k,m}^2} M_k$, and the a posteriori beam domain channel model may be further written as:

$$H_{k,m} = U_k \hat{H}_{k,m}^b V_{M_t}^H + U_k (M_{k,m}' \odot W_{k,m}) V_{M_t}^H \quad (43)$$

where $\hat{H}_{k,m}^b$ is a refined beam domain a posteriori mean, and a variance of $(M_{k,m}' \odot W_{k,m})$ is a refined beam domain a posteriori variance. It is defined that $\Omega_{k,m}' = M_{k,m}' \odot M_{k,m}'$.

IV. Robust Precoding Design

1. Problem Statement

Downlink transmission on the slot m is considered. The vector $x_{k,m}$ represents the $M_k \times 1$-dimensional sending vector of the $k^{th}$ UE on the slot m, whose covariance matrix is an identity matrix. On the slot m, a received signal $y_{k,m}$ of the $k^{th}$ UE may be represented as:

$$y_{k,m} = H_{k,m} P_{k,m} x_{k,m} + \sum_{l \neq k}^{K} H_{k,m} P_{l,m} x_{l,m} + z_{k,m} \quad (44)$$

where $P_{k,m}$ is a $M_k \times d_k$-dimensional precoding matrix of the $k^{th}$ UE, $z_{k,m}$ is a complex Gaussian random noise vector whose distribution is $CN(0, \sigma_z^2 I_{M_k})$, $\sigma_z^2$ is the variance of each element in the noise vector, and $I_{M_k}$ is an $M_k \times M_k$ identity matrix. Because the precoding matrix $P_{k,m}$ is designed based on the refined beam domain a posteriori statistical model, the design can adapt to various typical massive MIMO mobile scenarios, that is, robust, and therefore is referred to as refined beam domain downlink robust precoding. To reduce system implementation complexity, pilot signals and data signals need to be transmitted only in a dimension-reduced robust precoding domain. The transmitted robust precoding domain pilot signals are on the same time-frequency resources, and pilots of the users are not required to be orthogonal, that is, the pilots may be multiplexed. Specifically, precoding domain pilot signals transmitted by the BS to the users are frequency-domain signals generated by modulating a ZC sequence or ZC sequence group. After receiving a pilot signal, a mobile terminal performs channel estimation on a robust precoding domain equivalent channel, and the equivalent channel in the robust precoding domain is $H_{k,m} P_{k,m}$. For simplicity, it is assumed that the UE sides may obtain perfect CSI having respective robust precoding domain equivalent channel matrices. After receiving data signals, the users may detect robust precoding domain signals by using the received data signals. For each UE, total interference noise $$z'_{k,m} = \sum_{l \neq k}^{K} H_{k,m} P_{l,m} x_{l,m} + z_{k,m} \quad (45)$$

is considered as Gaussian noise. Let $R_{k,m}$ represents a covariance matrix of $z_{k,m}'$, and then $$R_{k,m} = \sigma_z^2 I_{M_k} + \mathbb{E}\left\{ \sum_{l \neq k}^{K} H_{k,m} P_{l,m} P_{l,m}^H H_{k,m}^H \right\} \quad (46)$$

where the expected function $\mathbb{E}\{\bullet\}$ represents an expected function for $H_{k,m}$ based on user-side long-term statistical information. According to channel reciprocity, the user-side long-term statistical channel information is consistent with BS-side long-term statistical channel information provided in the formula (43). Therefore, the expected function $\mathbb{E}\{\bullet\}$ may be calculated according to the formula (43). It is assumed that for the $k^{th}$ UE, $R_{k,m}$ is known. In this case, an ergodic rate of the $k^{th}$ user may be represented as:

$$r_{k,m} = \mathbb{E}\{\log \det(I_{M_k} + R_{k,m}^{-1} H_{k,m} P_{k,m} P_{k,m}^H H_{k,m}^H)\} \quad (47)$$

where $\mathbb{E}\{\bullet\}$ similarly represents a conditional expected function for $H_{k,m}$ obtained according to the a posteriori model in the formula (43).

It is defined that the function $f(P_{1,m}, P_{2,m}, \ldots, P_{K,m}) = \sum_{k=1}^{K} w_k r_{k,m}$ represents a weighted ergodic sum rate, that is, a weighted sum rate conditional mean calculated according to the established refined beam domain a posteriori statistical channel model. An objective of this embodiment is to design a precoding matrix $P_{1,m}, P_{2,m}, \ldots, P_{K,m}$ to maximize the weighted ergodic sum rate, that is, solve an optimization problem:

$$\operatorname*{argmax}_{P_{1,m}, P_{2,m}, \ldots, P_{K,m}} f(P_{1,m}, P_{2,m}, \ldots, P_{K,m}) \quad (48)$$

$$\text{s.t. } tr\left(\sum_{k=1}^{K} P_{k,m} P_{k,m}^H\right) \leq P$$

where $w_k$ is a weighting factor of the $k^{th}$ user, and P is a total power constraint. Solving methods for the optimization problem include the gradient method, the conjugate gradient method, the Newton iteration method, and the method for performing iteration according to an iteration formula obtained under a KKT condition. Moreover, during specific implementation, the target function may alternatively be replaced with an upper bound or a deterministic equivalent thereof. To describe the solving method of the optimization problem more clearly, an optimization method is provided below by using the upper bound of the target function as an example.

2. Low-Complexity Robust Precoding Design Method

First, rates of users in the target function in the optimization problem (48) may be replaced with an upper bound thereof:

$$r_{k,m} = \log \det(I_{M_k} + R_{k,m}^{-1} \mathbb{E}\{H_{k,m} P_{k,m} P_{k,m}^H H_{k,m}^H\}) \quad (49)$$

For the optimization problem (48) on which replacement is performed, a low-complexity robust precoding design method is provided below. First, $\check{R}_{k,m}$ is defined as:

$$\check{R}_{k,m} = R_{k,m} + \mathbb{E}\{H_{k,m} P_{k,m} P_{k,m}^H H_{k,m}^H\} \quad (50)$$

Further, the KKT condition of the optimization problem may be obtained as follows:

$$D_m P_{k,m} - A_{k,m} P_{k,m} + \mu P_{k,m} = 0, k = 1, 2, \ldots, K \quad (51)$$

$$\mu \geq 0 \quad (52)$$

$$tr\left(\sum_{k=1}^{K} P_{k,m} P_{k,m}^H\right) \leq P \quad (53)$$

where the matrices $A_{k,m}$, $B_{k,m}$, and $D_m$ are respectively as follows:

$$A_{k,m} = \mathbb{E}\{H_{k,m}^H R_{k,m}^{-1} H_{k,m}\} \quad (54)$$

$$B_{k,m} = \mathbb{E}\{H_{k,m}^H R_{k,m}^{-1} H_{k,m}\} - \mathbb{E}\{H_{k,m}^H \check{R}_{k,m}^{-1} H_{k,m}\} \quad (55)$$

$$D_m = \sum_{k=1}^{K} w_k B_{k,m} \quad (56)$$

Through the KKT condition, a robust precoding iteration formula may be obtained as follows:

$$P_{k,m}^{d+1} = (D_m^d + \mu^d I_{M_t})^{-1} A_{k,m}^d P_{k,m}^d \quad (57)$$

where $\mu^d$ is calculated as follows:

$$\mu^d = \sum_{k=1}^{K} tr\{(P_{k,m}^d)^H (A_{k,m}^d - D_m^d) P_{k,m}^d\} \quad (58)$$

To reduce complexity caused by matrix inversion $(D_m^d + \mu^d I_{M_t})^{-1}$ in the iteration algorithm, a truncated conjugate gradient method is adopted to find a solution, and steps of the conjugate gradient method are as follows:

First, $P_{k,m}(0)$, $L_{k,m}(0)$, and $N_{k,m}(0)$ are initialized.

$$P_{k,m}(0) = P_{k,m}^d \quad (59)$$

$$L_{k,m}(0) = \quad (60)$$
$$(D_m^d + \mu^d I_{M_t}) P_{k,m}(0) - A_{k,m}^d P_{k,m}(0) = (D_m^d + \mu^d I_{M_t}) P_{k,m}^d - A_{k,m}^d P_{k,m}^d$$

$$N_{k,m}(0) = -L_{k,m}(0) \quad (61)$$

Then, iterative update is performed according to steps as follows:

$$\alpha_n = \frac{\sum_{k=1}^{K} tr(L_{k,m}^{H}(n)L_{k,m}(n))}{\sum_{k=1}^{K} tr(N_{k,m}^{H}(n)(D_m^d + \mu^d I_{M_t})N_{k,m}(n))} \quad (62)$$

$$P_{k,m}(n+1) = P_{k,m}(n) + \alpha_n N_{k,m}(n) \quad (63)$$

$$L_{k,m}(n+1) = L_{k,m}(n) + \alpha_n(D_m^d + \mu^d I_{M_t})N_{k,m}(n) \quad (64)$$

$$\beta_n = \frac{\sum_{k=1}^{K} tr(L_{k,m}^{H}(n+1)L_{k,m}(n+1))}{\sum_{k=1}^{K} tr(L_{k,m}^{H}(n)L_{k,m}(n))} \quad (65)$$

$$N_{k,m}(n+1) = -L_{k,m}(n+1) + \beta_n N_{k,m}(n) \quad (66)$$

where n represents the $n^{th}$ iteration. The formula (57) or the truncated conjugate gradient method corresponding to the formula is an antenna domain precoding update method. Such a method may alternatively be performed in the refined beam domain, to reduce complexity. The truncated conjugate gradient method is a universal method for resolving the optimization problem, and is not only applicable to simplifying the formula (57), but also may be used for directly solving the optimization problem (48), and may be further used for solving robust precoding design under another optimization target. The implementation of the truncated conjugate gradient method in the refined beam domain is described below by using the truncated conjugate gradient method for simplifying the formula (57) as an example.

3. Detailed Steps of the Truncated Conjugate Gradient Method in the Refined Beam Domain The truncated conjugate gradient method may be implemented in the refined beam domain, to further reduce algorithm complexity. To further describe a calculation process of the truncated conjugate gradient method in the refined beam domain, detailed steps are provided below.

Step a): Obtain refined beam domain precoding through a refined sampling steering vector matrix. Specifically:

$$\tilde{P}_{k,m} = V_{M_t}^{H} P_{k,m}^{d} \quad (67)$$

Step b): Perform the sparse calculation of initial conjugate gradient by using refined beam domain a posteriori sparse statistical information. Specific steps are described as follows: First, a refined beam domain precoding energy matrix $\tilde{\Gamma}_{k,m}$ is calculated as follows:

$$\tilde{\Gamma}_{k,m} = \tilde{P}_{k,m} \odot \tilde{P}_{k,m} \quad (68)$$

Further, a sum $\tilde{\Gamma}_{sum}$ of refined beam domain precoding energy matrices of users is calculated as follows:

$$\tilde{\Gamma}_{sum} = \sum_{k=1}^{K} \tilde{\Gamma}_{k,m} \quad (69)$$

Then, a product $\tilde{H}_{k,l,m}^{e}$ of the beam domain a posteriori mean of the $k^{th}$ user and the beam domain precoding matrix of the $l^{th}$ user in the refined beam domain is calculated as follows:

$$\tilde{H}_{k,l,m}^{e} = \hat{H}_{k,m}^{b} \tilde{P}_{l,m} \quad (70)$$

Further, the interference plus noise covariance matrix $R_{k,m}$ and the interference noise plus signal covariance matrix $\check{R}_{k,m}$ are calculated as follows:

$$R_{k,m} = \sigma_z^2 I_{M_k} + \sum_{l \neq k}^{K} \tilde{H}_{k,l,m}^{e} (\tilde{H}_{k,l,m}^{e})^{H} + \eta_{k,m}^{post}(\tilde{\Gamma}_{sum} - \tilde{\Gamma}_{k,m}) \quad (71)$$

$$\check{R}_{k,m} = \sigma_z^2 I_{M_k} + \tilde{H}_{k,k,m}^{e} (\tilde{H}_{k,k,m}^{e})^{H} + \eta_{k,m}^{post}(\tilde{\Gamma}_{sum}) \quad (72)$$

where $\eta_{k,m}^{post}(\tilde{\Gamma}_{l,m}) = \text{diag}(\Omega_{k,m}'(\tilde{\Gamma}_{l,m}v))$, and v is an $M_k$-dimensional all-ones column vector. Then, $\tilde{Q}_{k,m}$ is calculated as follows:

$$\tilde{Q}_{k,m} = (\hat{H}_{k,m}^{b})^{H}(R_{k,m}^{-1}\tilde{H}_{k,k,m}^{e}) + \tilde{\eta}_{k,m}^{post}(R_{k,m}^{-1}, \tilde{P}_{k,m}) \quad (73)$$

where $\eta_{k,m}^{post}(C, \tilde{P}_{k,m})$ is calculated as follows:

$$\tilde{\eta}_{k,m}^{post}(C, \tilde{P}_{k,m}^{d}) = \sum_{i=1}^{M_k}([C]_{ii}\text{diag}\{[\Omega_{k,m}']_i\})\tilde{P}_{k,m} \quad (74)$$

In this case, the calculation formula of $A_{k,m}^{d} P_{k,m}^{d}$ is changed to:

$$A_{k,m}^{d} P_{k,m}^{d} = V_{M_t} \tilde{Q}_{k,m} \quad (75)$$

Let $E_{k,m} = R_{k,m}^{-1} - \check{R}_{k,m}^{-1}$. Then, $\Omega_{sum}$ is calculated as follows:

$$\Omega_{sum} = \sum_{k=1}^{K} \sum_{i=1}^{M_k}([E_{k,m}]_{ii}\text{diag}\{[\Omega_{k,m}']_i\}) \quad (76)$$

and $\tilde{T}_{k,m}$ is:

$$\tilde{T}_{k,m} = \sum_{l=1}^{K}(\hat{H}_{l,m}^{b})(R_{l,m}^{-1}H_{l,k,m}^{e}) + \Omega_{sum}\tilde{P}_{k,m} \quad (77)$$

Now, the calculation formula of $D_m^{d} P_{k,m}^{d}$ is changed to:

$$D_m^{d} P_{k,m}^{d} = V_{M_t} \tilde{T}_{k,m} \quad (78)$$

With reference to the foregoing calculation formulas of $A_{k,m}^{d}P_{k,m}^{d}$ and $D_m^{d}P_{k,m}^{d}$, the sparse calculation of initial conjugate gradient in the refined beam domain is performed. First, $\tilde{O}_{k,m}$ is calculated as follows:

$$\tilde{O}_{k,m} = \tilde{Q}_{k,m} - \tilde{T}_{k,m} \quad (79)$$

Then, the step size $\mu^d$ is updated as follows:

$$\mu^d = \sum_{k=1}^{K} tr\left\{\tilde{P}_{k,m}^H V_{M_t}^H V_{M_t} \tilde{O}_{k,m}\right\} \quad (80)$$

Finally, initialized matrices in the refined beam domain of the truncated conjugate gradient method are provided as follows:

$$\tilde{P}_{k,m}(0) = \tilde{P}_{k,m} \quad (81)$$

$$\tilde{L}_{k,m}(0) = \mu^d \tilde{P}_{k,m} - \tilde{O}_{k,m} \quad (82)$$

$$\tilde{N}_{k,m}(0) = -V_{M_t}^H V_{M_t} \tilde{L}_{k,m}(0) \quad (83)$$

Step c): Perform the sparse calculation of conjugate gradient update direction in the refined beam domain. The refined beam domain $\tilde{F}_{k,m}(n)$ is calculated as follows:

$$\tilde{F}_{k,m}(n) = \sum_{l=1}^{K} \left(\hat{H}_{l,m}^b\right)^H E_{l,m} \hat{H}_{l,m}^b \tilde{N}_{k,m}(n) + \left(\Omega_{sum} + \mu^d I_{M_t}\right) \tilde{N}_{k,m}(n) \quad (84)$$

Step d): Perform conjugate gradient calculation in the refined beam domain and update the precoding in the refined beam domain. Specifically, robust precoding is updated according to steps as follows:

$$\alpha_n = \frac{\sum_{k=1}^{K} tr\left(\tilde{L}_{k,m}^H(n) V_{M_t}^H V_{M_t} \tilde{L}_{k,m}(n)\right)}{\sum_{k=1}^{K} tr\left(\tilde{N}_{k,m}^H(n) V_{M_t}^H V_{M_t} \tilde{F}_{k,m}(n)\right)} \quad (85)$$

$$\tilde{P}_{k,m}(n+1) = \tilde{P}_{k,m}(n) + \alpha_n \tilde{N}_{k,m}(n) \quad (86)$$

$$\tilde{L}_{k,m}(n+1) = \tilde{L}_{k,m}(n) + \alpha_n \tilde{F}_{k,m}(n) \quad (87)$$

$$\beta_n = \frac{\sum_{k=1}^{K} tr\left(\tilde{L}_{k,m}^H(n+1) V_{M_t}^H V_{M_t} \tilde{L}_{k,m}(n+1)\right)}{\sum_{k=1}^{K} tr\left(\tilde{L}_{k,m}^H(n) V_{M_t}^H V_{M_t} \tilde{L}_{k,m}(n)\right)} \quad (88)$$

$$\tilde{N}_{k,m}(n+1) = V_{M_t}^H V_{M_t}\left(-\tilde{L}_{k,m}(n+1) + \beta_n \tilde{N}_{k,m}(n)\right) \quad (89)$$

Finally, steps c) and d) are repeated until a preset number of iteration times is reached or the precoding converges, and the precoding in the refined beam domain is converted into precoding in the antenna domain by using a refined sampling steering vector matrix, that is, $$P_{k,m}^{d+1} = V_{M_t} \tilde{P}_{k,m}(n).$$

V. Implementation Effects

To make a person skilled in the art better understand the solution of the present invention, comparison between results of ergodic sum rates of the robust precoding transmission method in this embodiment and conventional methods under two specific system configurations is provided below.

Figure 4:
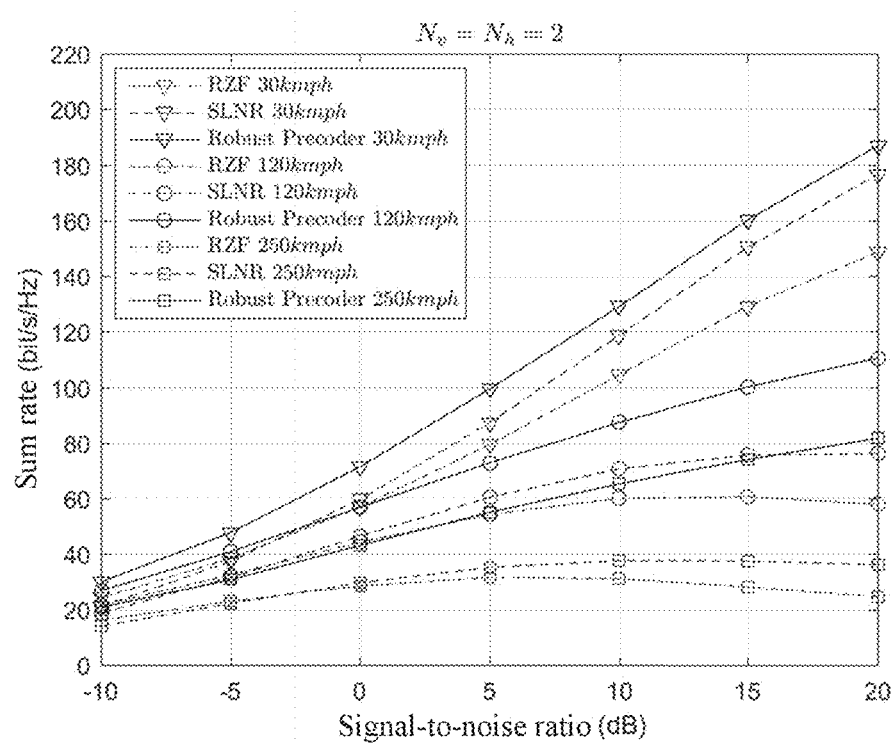
FIG. 4 is a schematic diagram of comparison between ergodic sum rate results of a beam domain robust precoding transmission method and an existing method.

First, comparison between results of the robust precoding transmission method in this embodiment and an RZF precoding method is provided. In the RZF method, it is assumed that the adopted outdated channel information is accurate channel information. A massive MIMO system whose configuration is $M_t=128$, $K=40$ and $M_k=1$ is considered, where an antenna configuration of the BS is $M_h=8$, $M_v=16$. For simplicity, movement speeds of all users are identically set to 30, 120, and 250 km/h. FIG. 4 provides comparison between results of ergodic sum rates of the robust precoding transmission method in this embodiment and the RZF and SLNR methods in three different mobile scenarios in the downlink of the considered massive MIMO system. It may be seen that from FIG. 4 that, the performance of the robust precoding transmission method in this embodiment is better than those of the RZF and SLNR precoding methods in each of the three different mobile scenarios. Further, it may be observed that the performance gain is relatively small under a low SNR, but gradually becomes notable as the SNR increases. It indicates that compared with the RZF and SLNR precoding methods, the robust precoding transmission method in this embodiment can more effectively suppress inter-user interference.

Figure 5:
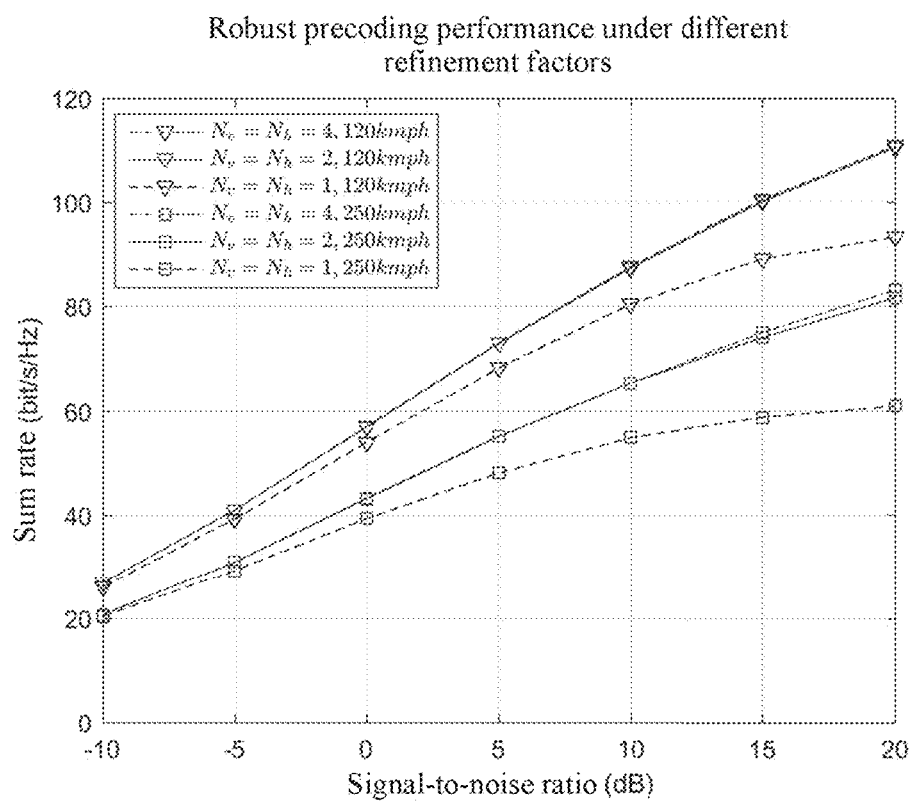
FIG. 5 is a schematic diagram of comparison between ergodic sum rate results of a beam domain robust precoding transmission method with several different refinement multiples.

Then, comparison between results of the robust precoding transmission method in this embodiment under different refinement multiples is provided. The parameters of the considered massive MIMO system are kept unchanged, and the movement speeds of the users are set to 120 and 250 km/h. To reflect effects of different refinement factors, three refinement factors are considered, and are respectively horizontal and vertical refinement with a multiple of 1, horizontal and vertical refinement with a multiple of 2, and horizontal and vertical refinement with a multiple of 4. FIG. 5 provides comparison between results of ergodic sum rates of the robust precoding transmission method in this embodiment in three refined sampling multiples in the downlink of the considered massive MIMO system. It may be seen that from FIG. 5 that, the performance of the robust precoding transmission method in this embodiment is improved with the increase in the refinement multiple under three refinement factors in each of two mobile scenarios. The rate of the refinement with a multiple of 2 is notably higher than that of the refinement with a multiple of 1, that is, performance achieved when DFT is used as a spatial feature direction. Further, it may be observed that the performance gain of the refinement with a multiple of 4 is inferior to that of the refinement with a multiple of 2. It indicates that in this simulation scenario, channel information provided by horizontal and vertical refinement with a multiple of 2 is sufficiently accurate for precoding performance.

Based on the same inventive idea, an embodiment of the present invention further discloses a computing device, including a memory, a processor, and a computer program stored in the memory and executable on the processor, where the computer program, when being loaded to the processor, implements the foregoing massive MIMO beam domain robust precoding transmission method or massive MIMO beam domain robust precoding design method.

During specific implementation, the device includes a processor, a communication bus, a memory, and a communication interface. The processor may be a general-purpose central processing unit (CPU), a microprocessor, an application-specific integrated circuit (ASIC), or one or more integrated circuits configured to control execution of a program in the solutions of the present invention. The communication bus may include a channel, to transmit information between the foregoing components. The communication interface being an apparatus using any transceiver or the like is configured to communicate with another device or a communication network. The memory may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or another optical disc storage, a disk storage medium or another magnetic storage device, or any other medium that can be used to carry or store expected program code in a command or data structure form and that can be accessed by a computer, but is not limited thereto. The memory may independently exist, and is connected to the processor through the bus. The memory may alternatively be integrated together with the processor.

The memory is configured to store application program code for performing the solutions of the present invention, and is controlled and executed by the processor. The processor is configured to execute the application program code stored in the memory, thereby implementing the information obtaining method provided in the foregoing embodiments. The processor may include one or more CPUs, or a plurality of processors may be included, and each of these processors may be a single-core processor or a multi-core processor. The processor may refer to one or more devices, circuits, and/or processing cores used for processing data (for example, computer program instruction).

Based on the same inventive idea, an embodiment of the present invention further discloses a massive MIMO beam domain robust precoding transmission system, including a BS and a plurality of UEs, where the BS is configured to: obtain a priori statistical channel information of the UEs in a refined beam domain; obtain a posteriori statistical channel information of the UEs in the refined beam domain based on a pilot signal and the a priori statistical channel information in the refined beam domain, where the a posteriori statistical channel information includes channel mean and variance information in the refined beam domain; and perform robust precoding transmission by using the a posteriori statistical channel information including the channel mean and variance information in the refined beam domain.

Based on the same inventive idea, an embodiment of the present invention further discloses a massive MIMO beam domain robust precoding transmission system, including a BS and a plurality of UEs, where the BS is equipped with the foregoing computing device.

In the embodiments provided in this application, it should be understood that the disclosed method may be implemented in other manners without going beyond the spirit and scope of this application. The current embodiment is only an exemplary example, and should not be used as a limitation, and the provided specific content should not limit the objective of this application. For example, some features may be ignored or not performed.

The technical means disclosed in the solutions of the present invention are not limited to the technical means disclosed in the foregoing implementations, and also includes technical solutions including any combination of the foregoing technical features. It should be noted that a person of ordinary skill in the art may make several improvements and modifications without departing from the principle of the present invention. All such modifications and modifications shall fall within the protection scope of the present invention.

What is claimed is:

1. A massive multiple-input multiple-output (MIMO) beam domain robust precoding transmission method, comprising:
    receiving a pilot signal transmitted by a mobile terminal or obtaining known channel information;
    transforming the received pilot signal or the obtained known channel information into a refined beam domain through a refined sampling steering vector matrix;
    obtaining a priori statistical channel information of user equipments (UEs) in the refined beam domain by using sample statistics in the refined beam domain, wherein the refined beam domain is a refined beam domain with a multiple of 1 or a refined beam domain with an integer multiple or a fraction multiple greater than 1, and a refined beam domain channel and an antenna domain channel are converted into each other through a refined sampling steering vector matrix;
    obtaining a posteriori statistical channel information of the UEs in the refined beam domain based on a pilot signal and the a priori statistical channel information in the refined beam domain, wherein the a posteriori statistical channel information comprises channel mean and variance information in the refined beam domain; and
    performing robust precoding transmission by using the a posteriori statistical channel information comprising the channel mean and variance information in the refined beam domain.

2. The massive MIMO beam domain robust precoding transmission method according to claim 1, wherein the antenna domain channel is obtained after the refined beam domain channel is left-multiplied by a user-side refined sampling steering vector matrix and right-multiplied by a conjugate matrix of a base station (BS)-side refined sampling steering vector matrix.

3. The massive MIMO beam domain robust precoding transmission method according to claim 1, wherein the a priori statistical channel information in the refined beam domain is obtained by a BS through uplink channel sounding; or obtained by a UE through downlink channel sounding.

4. The massive MIMO beam domain robust precoding transmission method according to claim 1, wherein the a posteriori statistical channel information in the refined beam domain is obtained by a BS through channel estimation and prediction by using an uplink pilot signal and the a priori statistical channel information in the refined beam domain; or obtained by a UE through channel estimation, prediction, and feedback by using a downlink pilot signal and the a priori statistical channel information in the refined beam domain.

5. The massive MIMO beam domain robust precoding transmission method according to claim 1, wherein channel mean and variance information of an a posteriori statistical channel model in the refined beam domain is a posteriori mean and a posteriori variance information of the channel in the refined beam domain; and the a posteriori mean and a posteriori variance information of the channel comprises:
    conditional mean and conditional variance information in the refined beam domain under a condition that a BS receives an uplink pilot signal; or conditional mean and conditional variance information in the refined beam domain under a condition that a UE receives a downlink pilot signal.

6. The massive MIMO beam domain robust precoding transmission method according to claim 1, wherein the obtaining the a priori statistical channel information of the UEs in the refined beam domain by using sample statistics in the refined beam domain is specifically: solving a channel energy matrix according to the sample statistics in the refined beam domain and an equation of a function matrix of the channel energy matrix, wherein in the equation, only the channel energy matrix or channel amplitude matrix is an unknown matrix, and other matrices are known matrices.

7. The massive MIMO beam domain robust precoding transmission method according to claim 1, wherein in the robust precoding transmission, a BS performs linear precoding matrix design of the UEs according to a weighted ergodic sum rate maximization criterion, and a weighted ergodic sum rate is a conditional mean of a weighted sum rate calculated according to the a posteriori statistical channel information in the refined beam domain.

8. The massive MIMO beam domain robust precoding transmission method according to claim 7, wherein the weighted ergodic sum rate maximization criterion is replaced with an upper bound of the weighted ergodic sum rate maximization criterion; or a sum rate in the weighted ergodic sum rate maximization criterion is replaced with a deterministic equivalent thereof.

9. A computing device, comprising a memory, a processor, and a computer program stored in the memory and executable on the processor, wherein the computer program, when being loaded to the processor, implements the massive MIMO beam domain robust precoding transmission method according to claim 1, or the massive MIMO beam domain robust precoding design method based on a truncated conjugate gradient method comprising:

transforming initial precoding into a refined beam domain through a refined sampling steering vector matrix, wherein the refined beam domain is a refined beam domain with a multiple 1 or a refined beam domain with an integer multiple or a fraction multiple greater than 1;

performing beam domain precoding update in the refined beam domain by using a posteriori statistical channel information, wherein the a posteriori statistical channel information in the refined beam domain is obtained based on a pilot signal and a priori statistical channel information in the refined beam domain; and transforming a precoding result in the refined beam domain into an antenna domain through the refined sampling steering vector matrix.

10. A massive multiple-input multiple-output (MIMO) beam domain robust precoding transmission system, comprising a base station (BS) and a plurality of user equipments (UEs), wherein the BS is configured to:

receive a pilot signal transmitted by a mobile terminal or obtaining known channel information;

transform the received pilot signal or the obtained known channel information into a refined beam domain through a refined sampling steering vector matrix;

obtain a priori statistical channel information of the UEs in the refined beam domain by using sample statistics in the refined beam domain, wherein the refined beam domain is a refined beam domain with a multiple of 1 or a refined beam domain with an integer multiple or a fraction multiple greater than 1, and a refined beam domain channel and an antenna domain channel are converted into each other through a refined sampling steering vector matrix;

obtain a posteriori statistical channel information of the UEs in the refined beam domain based on a pilot signal and the a priori statistical channel information in the refined beam domain, wherein the a posteriori statistical channel information comprises channel mean and variance information in the refined beam domain; and perform robust precoding transmission by using the a posteriori statistical channel information comprising the channel mean and variance information in the refined beam domain.

11. A massive multiple-input multiple-output (MIMO) beam domain robust precoding transmission system, comprising a base station (BS) and a plurality of user equipments (UEs), wherein the BS is equipped with the computing device according to claim 9.

* * * * *